US006667471B2

(12) United States Patent
Bos et al.

(10) Patent No.: US 6,667,471 B2
(45) Date of Patent: Dec. 23, 2003

(54) ELECTRO-OPTIC FILTER FOR VEHICLE IMAGING SYSTEM

(75) Inventors: Brent J. Bos, Tucson, AZ (US); Mark L. Larson, Grand Haven, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 10/206,558

(22) Filed: Jul. 26, 2002

(65) Prior Publication Data

US 2002/0185587 A1 Dec. 12, 2002

Related U.S. Application Data

(63) Continuation of application No. 09/493,522, filed on Jan. 28, 2000, now Pat. No. 6,426,492.
(60) Provisional application No. 60/135,657, filed on May 24, 1999.

(51) Int. Cl.[7] ............................................... H01L 27/00
(52) U.S. Cl. ................... 250/208.1; 250/208.2
(58) Field of Search ........................... 250/208.1, 206, 250/208.2, 214 AL, 226, 229; 326/61; 315/82

(56) References Cited

U.S. PATENT DOCUMENTS

| 5,239,405 A | 8/1993 | Varaprasad et al. ......... 359/272 |
| 5,550,677 A | 8/1996 | Schofield et al. ............ 359/604 |
| 5,668,663 A | 9/1997 | Varaprasad et al. ......... 359/608 |
| 5,670,935 A | 9/1997 | Schofield et al. ............ 340/461 |
| 5,724,187 A | 3/1998 | Varaprasad et al. ......... 359/608 |
| 5,729,379 A | 3/1998 | Allemand et al. ........... 359/270 |
| 5,780,160 A | 7/1998 | Allemand et al. ........... 428/426 |
| 5,796,094 A | 8/1998 | Schofield et al. ......... 250/208.1 |
| 5,910,854 A | 6/1999 | Varaprasad et al. ......... 359/273 |
| 5,986,797 A | 11/1999 | Lynam ........................ 359/275 |
| 6,154,306 A | 11/2000 | Varaprasad et al. ......... 359/273 |
| 6,201,642 B1 | 3/2001 | Bos ............................. 359/565 |
| 6,426,492 B1 * | 7/2002 | Bos et al. ................ 250/208.1 |

* cited by examiner

Primary Examiner—Hung Xuan Dang
(74) Attorney, Agent, or Firm—Van Dyke, Gardner, Linn & Burkhart, LLP (57) ABSTRACT

A vehicular imaging system for capturing an image includes an imaging sensor and an electro-optic filter. The electro-optic filter is operable to attenuate light in response to a voltage applied to said electro-optic filter. The electro-optic filter is positioned along an optic path between the imaging sensor and a scene being captured by the imaging sensor. The imaging system includes a control for applying the voltage to the electro-optic filter. Preferably, the control is operable to selectively apply the voltage to the electro-optic filter. Preferably, the control is operable to selectively apply the voltage to the electro-optic filter in response to an ambient light intensity.

23 Claims, 6 Drawing Sheets

ELECTRO-OPTIC FILTER FOR VEHICLE IMAGING SYSTEM

CROSS-REFERENCE TO RELATED APPLICATIONS

This non-provisional patent application is a continuation of U.S. patent application, Ser. No. 09/493,522, entitled filed Jan. 28, 2000 now U.S. Pat. No. 6,426,492 ELECTRO-OPTIC APERTURE FOR VEHICULAR IMAGING SYSTEM, which claims priority on U.S. Provisional Application, Ser. No. 60/135,657, filed May 24, 1999, Entitled ELECTROCHROMIC CAMERA FILTER, which are hereby incorporated by reference herein in their entireties.

BACKGROUND OF THE INVENTION

This invention relates generally to aperture stops for cameras or imaging sensors and, more particularly, to variable aperture stops for pixelated imaging array sensors.

To date, many camera or visions systems have been proposed for vehicular use, such as rearview vision systems or the like. The systems typically comprise a lens and camera for providing a focused image of a scene around a vehicle to the driver of the vehicle. The lenses typically comprise multiple optic elements, which are generally desirable to enhance the image quality to a desired level of resolution. Because these multiple element lenses may significantly add to the overall cost, size and weight of the system, it is highly desirable to minimize the number of optical elements that are necessary to focus an acceptable image onto the camera, in order to keep the costs low for such vehicular systems. However, this may lead to a reduction in image quality or resolution.

Furthermore, in order to obtain the desired image quality, a vision system may need to function at an f-ratio (f-ratio= focal length/entrance pupil diameter) of 1.5 or more, in order to properly control lens aberrations. High f-ratios increase the depth of field or focus range of a system but significantly limit the amount of light received by the camera. Low f-ratios allow more light into the system but may cause significant degradation in image sharpness depending on the optical system in use. Operating optical systems with high f-ratios may be adequate in daylight of other high lighting conditions, but may correspond to an aperture diameter which is not sufficiently large enough to allow a sufficient amount of light through to the camera during night time or other low lighting conditions. Implementation of a larger aperture lowers the system f-ratio and helps alleviate low lighting problems, but this typically reduces image quality and decreases the depth of field or focus range of the optical system.

It has been proposed to implement an adjustable, rotatable aperture with variable diameter aperture settings in vision systems. Such rotatable apertures may provide enhanced image quality during periods of adequate lighting by using small aperture diameters, while providing improved lighting to the camera during lower light conditions by increasing the aperture size. Although implementation of a larger aperture during the low lighting conditions may reduce image quality, such an effect would not likely significantly degrade the image quality in a practical sense, since to the naked eye, there appears to be fewer spatial frequencies present in night time or other low lighting conditions. However, such a movable aperture comprises multiple movable components and mechanisms, which may significantly add to the cost and to reliability concerns of the device. Additionally, such a device may be of a greater size than is desirable for automotive applications, and may thus take up too much space within the tight space constraints of the vehicular application to be commercially practicable.

SUMMARY OF THE INVENTION

The present invention is intended to provide an electro-optic aperture for imaging sensors or cameras which is operable to vary the amount of energy being received by the sensors. An aperture according to aspects of the present invention can selectively allow a greater amount of light to pass therethrough when such energy or light would be useful to further illuminate a scene, such as when the intensity of the ambient decreases. As the lighting conditions increase, the aperture is operable to significantly attenuate a portion or region of the energy passing through the aperture, such that a smaller amount of light is received by the sensor. The smaller aperture or opening provides for improved focusing and greater depth of field of an image passing through the electro-optic aperture to the sensor during higher lighting conditions.

According to an aspect of the present invention, an imaging system for capturing an image of a scene comprises an imaging sensor, an electro-optic aperture and a control. The electro-optic aperture is operable to selectively attenuate light from the scene that is passing through at least one region of the aperture. The electro-optic aperture is positioned along an optic path from the scene to the imaging sensor. The control is operable to selectively activate the electro-optic aperture in response to an electronic signal. Preferably, the electro-optic aperture comprises an electrochromic medium, such as an electrochromic thin film, an electrochromic solid polymer film or an electrochromic solution, that attenuates the region of the light passing through the aperture in response to a voltage being applied to a pair of transparent electronic conductors of the electro-optic aperture. Optionally, the electrochromic medium is partially disposed on the transparent conductors and defines an opening in the electrochromic aperture that is void of the electrochromic medium. Alternately, one or both of the transparent electronic conductors, between which the electrochromic medium is disposed, can be zoned to create electrically isolated zones, such that each zone may be selectively energized to attenuate each selected zone of the aperture. Preferably, the imaging system further comprises a focusing lens with the electro-optic aperture being positioned between the focusing lens and the scene.

According to another aspect of the present invention, an imaging system for sensing an image of a scene comprises an imaging sensor, a focusing lens, an electrochromic aperture, and a control which is operable to energize the electrochromic aperture by applying a voltage thereto. The focusing lens is operable to focus the image of the scene onto the imaging sensor. The focusing lens is positioned along an optic path between the scene and the imaging sensor. The electrochromic aperture comprises at least one outer region and an inner region and is positioned along an optic path between the scene and the focusing lens. The electrochromic aperture is operable to attenuate energy received from the scene in the outer region when the aperture is energized, while allowing substantially non-attenuated energy to pass through the inner region.

In one form, the electrochromic medium may be disposed between transparent electronic conductors, which may comprise electrically isolated zones, each of which is selectively addressable by the control, such that at least one outer ring of the conductors is selectively energized, while an inner ring is de-energized. The control is then operable to selectively address the rings or zones in order to selectively energize the corresponding rings of electrochromic medium. In another form, the electrochromic aperture may comprise multiple layers of electrochromic medium and electronic conductors, each layer defining a different size opening through the aperture. The control may then selectively energize at least one of the layers to change the size of the opening in electrochromic aperture. Preferably, the control is operable to selectively energize the electrochromic aperture in response to the level of ambient light present in the scene.

These and other objects, advantages, purposes and features of this invention will become apparent upon review of the following specification in conjunction with the drawings.

DESCRIPTION OF THE PREFERRED EMBODIMENTS

Figure 1:
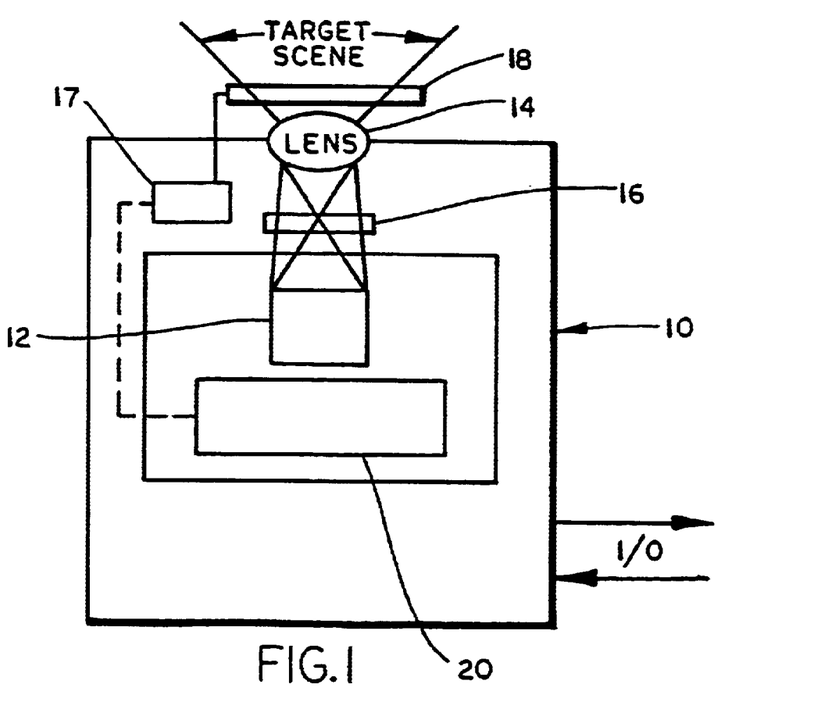
FIG. 1 is a block diagram of an imaging sensor module useful with the present invention.

Referring now specifically to the drawings, and the illustrative embodiments depicted therein, there is shown in FIG. 1 an imaging sensor module 10 for receiving an image of a target scene. Imaging sensor module 10 may be especially useful with a vehicle in conjunction with, for example, a vehicle headlamp control of the type disclosed in commonly assigned U.S. Pat. No. 5,796,094, issued to Schofield et al., the disclosure of which is hereby incorporated herein by reference, a vehicle back-up aid of the type disclosed in commonly assigned, co-pending U.S. patent application, Ser. No. 09/199,907, filed Nov. 25, 1998 by Bos et al., and/or the type disclosed in commonly assigned, co-pending, U.S. patent application, Ser. No. 09/361,814, filed Jul. 27, 1999 by Bos, now U.S. Pat. No. 6,201,642, the disclosures of which are hereby incorporated herein by reference, or a vehicle vision system of the type disclosed in commonly assigned U.S. Pat. No. 5,670,935, issued to Schofield et al., the disclosure of which is hereby incorporated herein by reference. Imaging sensor module 10 could also have other vehicular and non-vehicular applications.

Imaging sensor module 10 comprises a sensor array 12, which preferably receives the image of the target scene via a focusing lens 14 and an electro-optic aperture 18, both of which are positionable along an optic path between the target scene and sensor 12. Imaging sensor module 10 may further comprise a color filter 16, which is preferably a conventional color filter, which facilitates the determination of color in the image received by sensor 12. Electro-optic aperture 18 is operable to control the amount of light that is allowed through the aperture 18 and lens 14, and received by sensor array 12, in response to a voltage applied to aperture 18 by a control 17. An imaging control 20 is also included to receive an output from imaging array sensor 12 and convert the output to digital values via an analog to digital converter (not shown) and communicate the values to an appropriate circuit, such as a display or other receiving circuits, depending on the particular application of the present invention.

Figure 3:
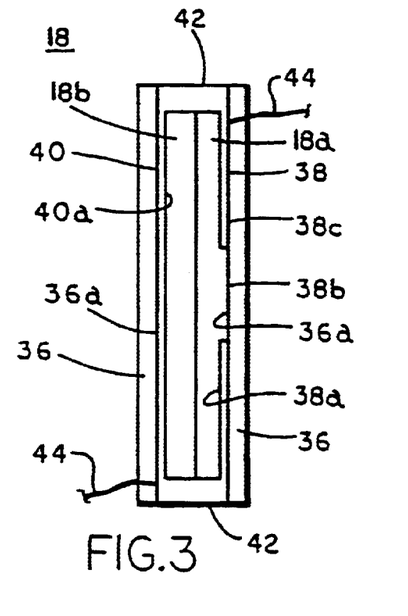
FIG. 3 is an enlarged side elevation of an electro-optic aperture useful with the present invention.
Figure 4A:
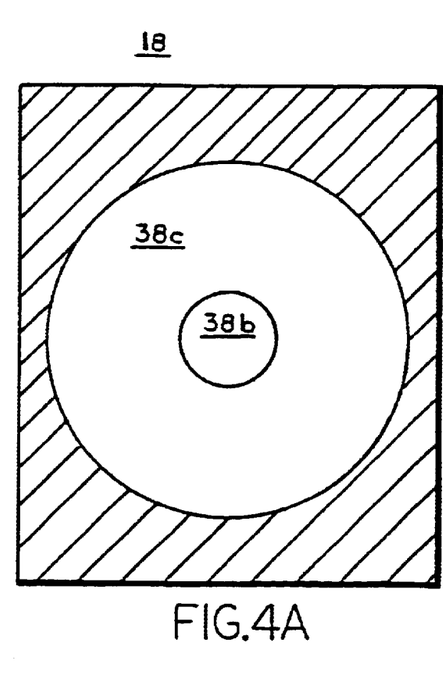
FIG. 4A is an enlarged end view of the aperture of FIG. 3, when the electro-optic aperture is de-energized.
Figure 4B:
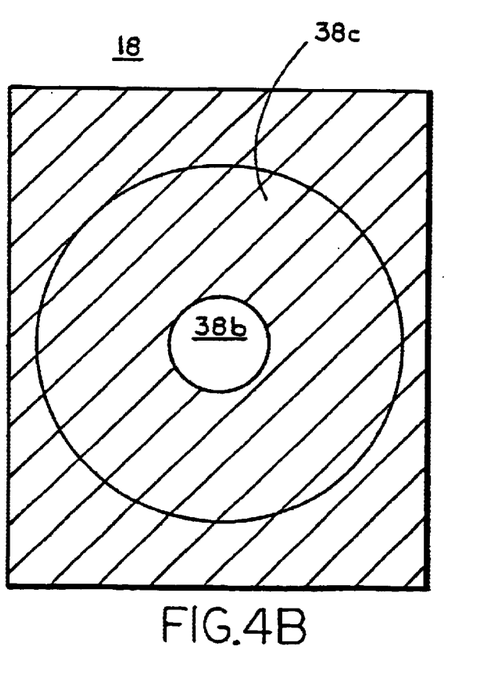
FIG. 4B is the same view as FIG. 4A, when the electro-optic aperture is energized.

Preferably, electro-optic aperture 18 includes an electrochromic medium, such as an electrochromic film or an electrochromic solution that is disposed between a pair of transparent, electronic conductors 38 and 40 (FIG. 3). The conductors 38 and 40 are preferably partially disposed on aperture 18 in a generally ring-shaped pattern, as shown in FIGS. 4A and 4B. The electrochromic medium is energizable to attenuate or block the energy passing through aperture 18 in the energized or darkened regions, to reduce the energy received by camera or sensor 12.

The corresponding smaller transmissive region of aperture 18 functions to increase the depth of field and reduce and/or control lens aberrations, thereby improving the overall focusing of the scenic image received by the camera. Control 20 is operable to at least occasionally activate imaging array sensor 12 and may selectively activate, deactivate and/or otherwise adjust electro-optic aperture 18 in response to variations in lighting conditions. As disclosed in commonly assigned U.S. Pat. No. 5,796,094, control 20 may be capable of determining a level of light around the vehicle. Alternatively, a separate photo sensor could be used to determine light conditions to control the signal applied to aperture 18.

Control 17 is operable to activate aperture 18 to darken or otherwise reduce transmissivity of energy in a defined region of aperture 18. Because the region or regions which are darkened preferably encircle an inner region, darkening one or more outer regions reduces the size of a center transmissive region of aperture 18, which allows substantially non-attenuated energy to pass therethrough. The smaller transmissive region reduces the amount of light passing through aperture 18 and thus through lens 14 to sensor 12. The smaller opening thus facilitates sharper focusing and greater depth of field in an image focused on sensor 12, while reducing the overall amount of light received by sensor 12 under brighter lighting conditions, so as to avoid the image becoming washed out or too bright due to overexposure. By deactivating the outer regions of electro-optic aperture 18 as lighting conditions darken, the size of the clear or transmissive inner region or aperture may be increased to allow a greater amount of light through aperture 18, thereby providing further illumination of the image of the target scene as received by sensor 12. The resulting decrease in the depth of field or focus range is not as great a concern in low light conditions, since the human eye is less able to detect spatial separation or depth in low lighting conditions, and thus is less affected by a smaller depth of field in such conditions. Also, the resulting lower image quality is not of concern since in typical dark conditions the human eye cannot discern details very well. Accordingly, the reduced image quality will not be readily noticeable by a user of the system.

Electro-optic aperture 18 thus provides an adjustable opening to allow a greater amount of light to pass therethrough in low lighting conditions, while attenuating or blocking a portion of the light when conditions are brighter, in order to provide improved resolution and overall focusing of an image by the lens and sensor. If the imaging array sensor is used to determine the ambient level of light, the control may then monitor the exposure time, which may be automatically determined by the array sensor. If the maximum exposure time is being used by the sensor, then the control could de-energize the electro-optic aperture in order to bleach the cell and provide more light to the sensor. The control may further respond to varying threshold exposure time levels to energize or de-energize the aperture as a change in lighting conditions is detected by the sensor.

Electro-optic aperture 18 of the present invention is preferably applied to a pixelated imaging array sensor, such as a CCD or a CMOS sensor. However, the electro-optic aperture may be implemented in conjunction with other sensors, and may be implemented with or without a color filter or process associated with the sensor, without affecting the scope of the present invention. Electro-optic aperture 18 may further be implemented with an electro-optic filter of the type disclosed in commonly assigned U.S. Provisional Application, Ser. No. 60/135,657, filed May 24, 1999 by Brent J. Bos for ELECTROCHROMIC CAMERA FILTER, which is hereby incorporated herein by reference.

Figure 2:
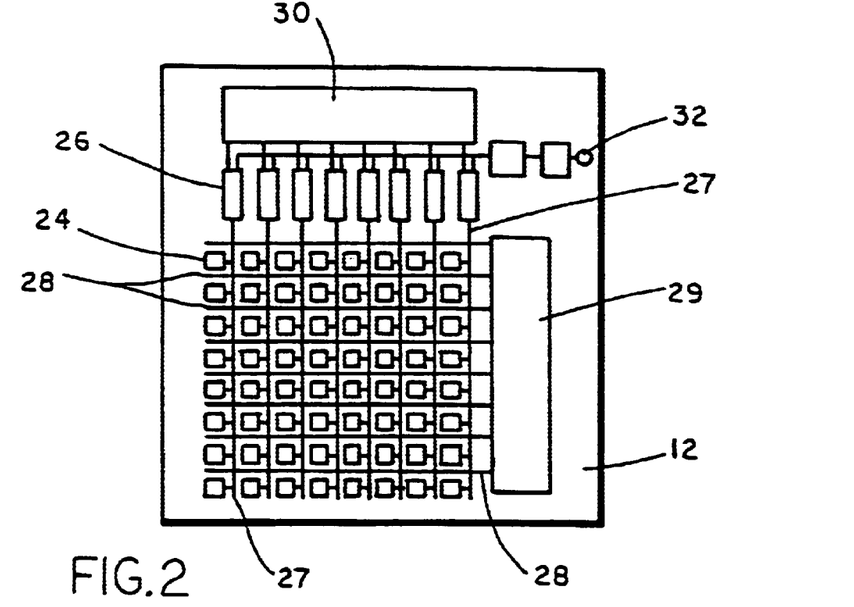
FIG. 2 is a schematic of a light-sensing array useful with the invention.

Referring now to FIG. 2, imaging array sensor 12 is preferably similar to those described in commonly assigned U.S. Pat. Nos. 5,550,677 and 5,796,094, the disclosures of which are hereby incorporated herein by reference. Briefly, imaging array sensor 12 preferably comprises a plurality of photon accumulating light sensors or pixels 24. The array of photo-sensors 24 are interconnected to a vertical shift register 29 and a horizontal shift register 30 via a common word-line 28 and a common bit-line 27, respectively. The bit-lines 27 are also interconnected with amplifiers 26. The registers 29 and 30 function to individually access each photo-sensor pixel or element 24 and provide an output 32 associated with the individual signals to the analog-to-digital converter.

As white or non-filtered light from the target scene is received by imaging module 10, color filter 16 may function to separate the light into spectral regions in a known manner. Preferably, color filter 16 is a mosaic filter which may be deposited directly onto the photo-element array of sensor 12 or may otherwise be positioned along the optic path between the target scene and sensor 12. Control 20 may then process the intensity of light received by the pixels, each of which is associated with a particular color tile or filter, in order to determine the color of light received by each pixel or group of pixels and thus the appropriate colors for the image being received by sensor 12. Other known color filters or processes may also or otherwise be implemented without affecting the scope of the present invention. Furthermore, the present invention is applicable with a monochromatic sensor, which does not include color filtering or processing. As shown in FIG. 1, electro-optic aperture 18 may be implemented between the target scene and lens 14, although the aperture may be positioned elsewhere between the scene and the camera, such as within a multi-element lens, between a reflector and a lens, or the like, without affecting the scope of the present invention.

Electro-optic aperture 18 preferably includes a thin electrochromic medium or film at least partially disposed across the aperture which is transmissive at all wavelengths of light when no voltage is applied to the aperture 18. Preferably, electro-optic aperture 18 is similar to the electrochromic devices disclosed in commonly assigned U.S. Pat. Nos. 5,729,379 and 5,780,160, the disclosures of which are hereby incorporated herein by reference. As shown in FIG. 3, electro-optic aperture 18 preferably includes an electrochromic medium, such as an electrochromic thin film, an electrochromic solid polymer film, or an electrochromic solution, or the like. The electrochromic medium may comprise an electrochromically active material 18a and an electrolyte material 18b. Electrochromically active material 18a may be an inorganic material, an organic material or blends and composites of inorganic and organic electrochromically active materials. Preferably, an inorganic metal oxide, such as Tungsten Oxide ($WO_3$), may be implemented. However, other metal oxides, such as $V_2O_5$, $MoO_3$, $Nb_2O_5$, $TiO_2$, $CuO$, $Ni_2O_3$, $Ir_2O_3$, $Cr_2O_3$, $Co_2O_3$, $Mn_2O_3$ or other mixtures without affecting the scope of the present invention. Preferably, the electrolyte material 18b comprises a propylene carbonate (PC), sulfolate (TS), a redox active material, which is preferably a metallocene such as Ferrocene (Fc), and a Lithium compound, such as $LiClO_4$ or $LiBF_4$ or the like. The electrochromic medium 18 is most preferably selected to significantly attenuate a majority of or all wavelengths of light passing through energized regions of the aperture and being received by imaging array sensor 12. However, other materials may be selected to attenuate only certain spectral regions of light.

As shown in FIG. 3, the electrolyte material 18b and electrochromically active material 18a are contained between a pair of transparent substrates 36 with transparent counter-conducting electrodes 38 and 40 positioned between the electrochromic medium materials 18a and 18b and each of the substrates 36. The transparent substrates 36 may be glass or plastic such as acrylic, polycarbonate, allyl diglycol carbonate or the like. These substrates 36 may also include a coating on their exterior surfaces such as an anti-reflection coating, an anti-fogging coating, an anti-abrasion coating and/or an ultraviolet absorber coating or the like. These protective coatings allow electro-optic aperture 18 to be positioned at an outer area of imaging module 10, such as between the target scene and lens 14. Preferably, the material of the conductive electrodes 38 and 40 is a thin transparent conductive coating such as an Indium Tin Oxide (ITO), a doped indium oxide, a doped tin oxide (such as with Fluorine or Antimony), a doped zinc oxide, or a tin oxide or a zinc oxide or the like and is preferably disposed onto an inner surface 36a of each substrate 36 as a coating. At least one of the conductive electrodes 38 is only partially disposed as a ring 38c between the electrochromic material 18a and substrate 36 around an inner area, so as to define an inner, non-coated region 38b on aperture 18, which does not have the conductive electrode material. Although shown with only one electrode 38 being partially disposed on one of the substrates, a more pronounced and definite transition from clear to dark may be provided by defining a ring of conductive material and corresponding non-coated regions on both substrates.

Electrochromically active material 18a may then be contactedly disposed on an inner surface 38a of one of the conducting electrodes 38 while the electrolyte 18b contactedly fills the gap between the electrochromically active material 18a and an inner surface 40a of the other conducting electrode 40. The electrolyte 18b may be a solid or liquid material. A circumferential seal 42 may also be provided around a perimeter of the aperture to seal the chemical solutions within the aperture. A power source (not shown) may then be applied to an electrical connector 44 to energize electro-optical aperture 18 via the counter conducting electrodes 38 and 40, thereby causing the electrochromically active material 18a and electrolyte material 18b to darken or otherwise reduce the transmissivity of the light passing through aperture 18 in the coated region 38c. Because the conducting electrode 38 is only present in the outer region 38c, only this outer region 38c is darkened when aperture 18 is energized. This is best shown in FIGS. 4A and 4B, where FIG. 4A shows the aperture in its de-energized state, with both the inner region 38b and the outer region 38c allowing non-attenuated light to pass therethrough. When the aperture 18 is energized (FIG. 4B), the outer region 38c is darkened, while the inner region 38b continues to allow light to pass therethrough.

Figures 5A, 5B, 5C, 7:
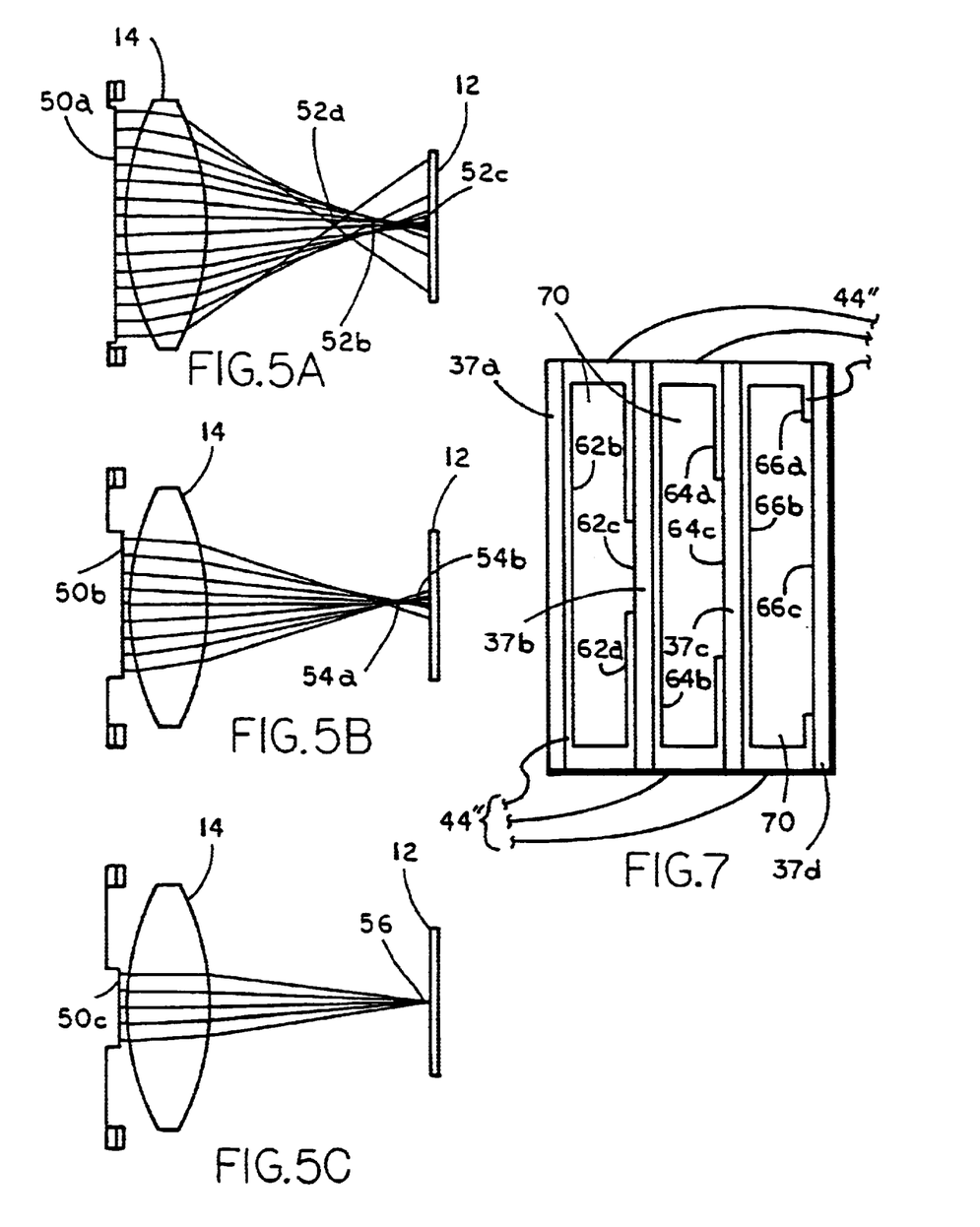
FIGS. 5A–5C are schematics of an aperture, lens and camera system in accordance with the present invention, showing the effects of a variable aperture on the focusing of an image through the lens on the camera.
FIG. 7 is another alternate embodiment of the present invention having separate conductive coatings on the aperture for varying the size of the opening therethrough.

The effects of the change in aperture setting or opening for light to pass through aperture 18 would be obvious to one of ordinary skill in the field of optics, and are best shown in FIGS. 5A through 5C. As shown in FIG. 5A, a large aperture opening 50a causes the light to pass through the lens 14 and refract to multiple focal points, generally referred to at 52a, 52b and 52c, with some of these focal points being remote from the image sensor 12. Accordingly, only the portion of the ray bundle which has its focal point 52c at the image sensor is sharply focused by the lens on the sensor, while the other portions of the ray bundle with focal points in front of or behind the image sensor 12 will be out of focus. As shown in FIG. 5B, with a smaller aperture opening 50b, a majority of the light rays passing through lens 14 are focused or nearly focused on imaging sensor 12 at 54b, while only a small portion are brought in to focus before or after the sensor 12, such as at point 54a. Furthermore, as shown in FIG. 5C, with a still smaller aperture opening 50c, the image refracted through lens 14 is brought into a sharp focal point 56 on imaging sensor 12, thereby providing a sharper overall image on the sensor which has a greater depth of field or range of focus.

Accordingly, as shown in FIG. 4A, when electro-optic aperture 18 is de-energized, such that both the inner region 38b and the outer region 38c are substantially transparent and thus allow the light or energy to pass therethrough, a greater amount of light may pass through the lens and be received by the imaging sensor, thereby providing improved performance of the sensor when lighting conditions are low. While such an opening improves the vision performance of the sensor at night, it results in a greater portion of the image received by the sensor to be out of focus, as shown in FIG. 5A, due to aberrations or a shorter range of focus. When electro-optic aperture 18 is energized, as shown in FIG. 4B, the outer region 38c is darkened such that light or energy only passes through the inner region 38b. This results in improved resolution and focusing of the overall image on the sensor, as shown in FIGS. 5B and/or 5C, and improved control of lens aberrations, thereby providing a sharper focused overall image of the scene to the driver of the vehicle.

Preferably, control 17 is operable to selectively energize and/or de-energize electro-optic aperture 18 as the sensed lighting conditions change, and may further be operable to continuously vary the voltage being applied to aperture 18 in response to lighting changes, as discussed below. When lighting conditions are low, such as at nighttime, electro-optic aperture 18 may be de-energized or otherwise adjusted so that imaging sensor 12 may receive a greater amount of light through a larger opening in aperture 18. Additionally, in low light conditions, the image may be processed as black and white such that the entire spectrum of energy, preferably including the near infrared and infrared energy which otherwise may be filtered out by color filters or infrared filters, provides additional information about the image of the target scene. Conversely, in higher intensity light conditions such as daytime, the image may be processed as a color image. Electro-optic aperture 18 may then be energized or adjusted to provide a smaller opening or iris in order to provide sharper focusing capabilities to the camera and avoid over exposure of the images received, thereby providing improved overall focusing of an output signal or image from imaging sensor 12 and allowing the sensor to be more effectively operable under such higher lighting conditions.

Accordingly, electro-optic aperture 18 is preferably selectively energizable or de-energizable and the voltage being applied thereto may even be continuously varied, in response to the lighting conditions in the target scene. Control 17 then may de-energize or vary the transmissivity of aperture 18 and process the information received from imaging array sensor 12 in one manner during low lighting conditions in order to maximize the opening of aperture 18 and thus maximize the light received by sensor 12 from the scene, while energizing or increasing the voltage to the electro-optic aperture 18 and maybe processing the information from imaging array sensor 12 in a different manner during high lighting conditions, in order to better focus the overall image received by sensor 12. Control 20 may determine the lighting conditions or the amount of light being received by sensor 12 by measuring pixel values of sensor 12 or by communicating with an additional photo-sensor or the like (not shown), and accordingly selectively energize or de-energize electro-optic aperture 18 or continuously adjust the voltage being applied thereto in response to the sensed conditions. Although shown and described as comprising electrochromically active materials and electrolyte materials, the electro-optic aperture may alternately incorporate any electrochromic medium known in electrochromic technology. For example, the electro-optic aperture can comprise an electrochromic element that comprises a front substrate and a rear substrate with an electrochromic medium disposed therebetween, such as a solid polymer matrix electrochromic medium such as is disclosed in U.S. patent application, Ser. No. 09/350,930, filed Jul. 12, 1999 by Desaraju V. Varaprasad et al., entitled ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES, now U.S. Pat. No. 6,154,306, or such as is disclosed in U.S. Pat. No. 5,668,663; 5,724,187; 5,910,854 and 5,239,405, the entire disclosures of which are hereby incorporated by reference herein. Most preferably, in laminate-type electrochromic aperture elements, the front substrate comprises a glass plate of thickness less than about 1.6 mm, most preferably about 1.1 mm thickness or lower, and the rear substrate comprises a glass plate of thickness equal to or greater than about 1.6 mm, more preferably greater than about 1.8 mm thickness, most preferably equal to or greater than about 2.0 mm thickness.

In an alternate embodiment, multiple levels of electro-optic apertures or multiple layers of electrodes and corresponding electrochromic media may be implemented substantially adjacent to an imaging array sensor along the optic path between the target scene and the sensor. Preferably, each of the electro-optic apertures or layers would include a different sized aperture or iris defined by a different region of the electrochromic film material, and thus may be operable to attenuate or block out different sized rings of light. The aperture with the smallest opening or transmissive region may be positioned closest to the lens, with each larger opening aperture being positioned between the smallest aperture and the scene in order of their increasing, sizes of openings. However, other orientations may be implemented without affecting the scope of the present invention. A control circuit may selectively energize one or more of the electro-optic apertures or layers at a given time to block or attenuate the light around a desired aperture size for that particular application and/or lighting conditions. The electro-optic aperture or apertures thus comprise a radial, selectively attenuatable electrochromic iris. Preferably, each of the stacked apertures comprise conductive material coatings with openings or non-coated regions on both substrates of the aperture, in order to make the transition from light or clear to dark more pronounced. This allows the present invention to change the size of the iris or opening in order to vary the amount of light being received by the imaging sensor for any particular time or application.

Figure 6:
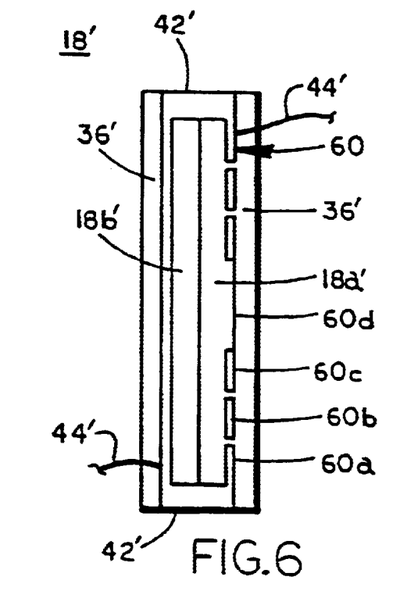
FIG. 6 is an alternate embodiment of the present invention, having a variable resistance conductive coating on the aperture, which comprises multiple selectively addressable zones.

As shown in FIG. 6, an alternate embodiment 18' of the electro-optic aperture of the present invention may comprise a conductive coating 60 which has zones or portions 60a, 60b and 60c. Each of these zones 60a, 60b and 60c is electrically isolated from the others, such that each portion may be selectively addressed and energized by the control. The rings or zones may be isolated by separately coating separated rings of conductive material on one or both substrates or by coating the substrate and then scoring (or laser etching) the desired pattern, such as one or more rings, around an inner uncoated window or iris, or by any other means of separating or isolating the portions or rings. The gap between each ring or track prevents the rings from being energized when an adjacent ring is being selectively activated by the control.

Each of the rings or zones are electrically isolated from the others and separately addressable and energizable via a separate wiring or contact (not shown), such that the control is operable to selectively access one or more of the tracks or rings to selectively vary the radial size of the iris. For example, a first signal voltage may be applied to outer rung or zone 60a, thereby darkening an outer region of the electrochromic materials 18a' and 18b', while inner regions 60d, 60c and 60b remain bleached or clear. A second signal may be voltage applied to the second ring or zone 60b while the outer ring 60a is also energized, thereby darkening a second region of the electrochromic materials which corresponds to the rings 60a and 60b of the conductive material 60. The inner regions 60c and 60d would then be non-energized to allow light to pass therethrough. The control may apply yet another signal or voltage to inner conductive ring 60c, which would result in energizing an innermost ring 60c of the conductive material, while still energizing the outer rings 60a and 60b, in order to also darken an inner ring or region of the electrochromic materials corresponding to the inner ring 60c of the conductive materials. The smallest inner region 60d would then be non-energized to allow substantially non-attenuated light to pass therethrough. Although shown as having three isolated rings of conductive material, which respond to different signals from the control, clearly the electro-optic aperture may comprise multiple rings, each of which responds to a different signal than a radially outwardly positioned ring.

Referring now to FIG. 7, an alternate embodiment 18" is shown with three separate sets of conductive coatings 62a and 62b, 64a and 64b, and 66a and 66b. The coatings 62a, 62b, 64a, 64b, 66a and 66b are applied to corresponding pairs of a plurality of substrates 37a, 37b, 37c, and 37d. Preferably, the inner substrates 37b and 37c have a conductive coating on both sides thereof. As shown in FIG. 7, at least one side of each of the sets of coatings, such as the coatings 62a, 64a and 66a, are partially disposed on their respective substrates 37b, 37c and 37d to define different sized openings 62c, 64c and 66c. An electrochromic medium 70 is disposed between each pair of coatings and substrates in a similar manner as discussed above with respect to electro-optic aperture 18. Each of the conductive coatings may be separately accessed by the control via connectors 44" to selectively vary the radial size of the transparent iris. Each of the coatings may be separately energized by the control in order to provide the desired opening in accordance with the lighting conditions and application of the electro-optic aperture. Although shown with three separate conductors and electrochromic media, clearly the present invention may comprise a greater or fewer number of layers, without affecting the scope of the present invention. Furthermore, each of the layers may be entirely contained within a separate pair of substrates, such that each layer comprises a separate electrochromic aperture having a different sized transparent iris or center region.

It is further envisioned that the electro-optic aperture may comprise two or more rings of conductive material, each ring having a resistance which differs from the others, such that each ring is responsive to a different level of voltage being applied thereto. These rings may or may not be electrically isolated from one another, since a lower voltage may only energize an outer ring, while an inner ring is not energized until the voltage is increased to a higher level. It is further envisioned that the conductive material could have an infinitely variable resistance, such that the size of the aperture could be infinitely adjustable in response to a change in voltage applied to the aperture. The outer edges of the conductive material may respond to a low voltage, while an increased voltage energizes the outer region and inwardly positioned portions, with an innermost ring of conductive materials responding to a maximum voltage applied to the electro-optic aperture.

Therefore, the present invention provides a variable aperture, which is selectively operable to substantially attenuate all wavelengths of light in a defined region, so as to selectively reduce the amount of light passing therethrough. This provides sharper and improved focusing of an image on a camera or sensor and greater depth of field when lighting conditions are bright enough to allow for a smaller opening in the aperture, without adversely affecting the quality of the image received by the sensor. When low lighting conditions are encountered, the electrochromic materials of the present invention may be de-energized to allow them to "bleach" by discontinuing the applied voltage to the conductive materials (or, for some electrochromic media, applying a bleaching voltage of polarity opposite to that of the coloring voltage). This allows an increased amount of light through the electro-optic aperture and lens, thereby improving the illumination and thus the quality of the image as received by the sensor. Furthermore, the electro-optic aperture of the present invention may be automatically energized and/or de-energized and/or continuously varied in response to changes in the sensed lighting conditions surrounding the imaging array sensor, thereby providing improved illumination of the sensor during night time conditions, while further providing improved focusing and greater control of lens aberrations during daytime or high light conditions.

Figure 8:
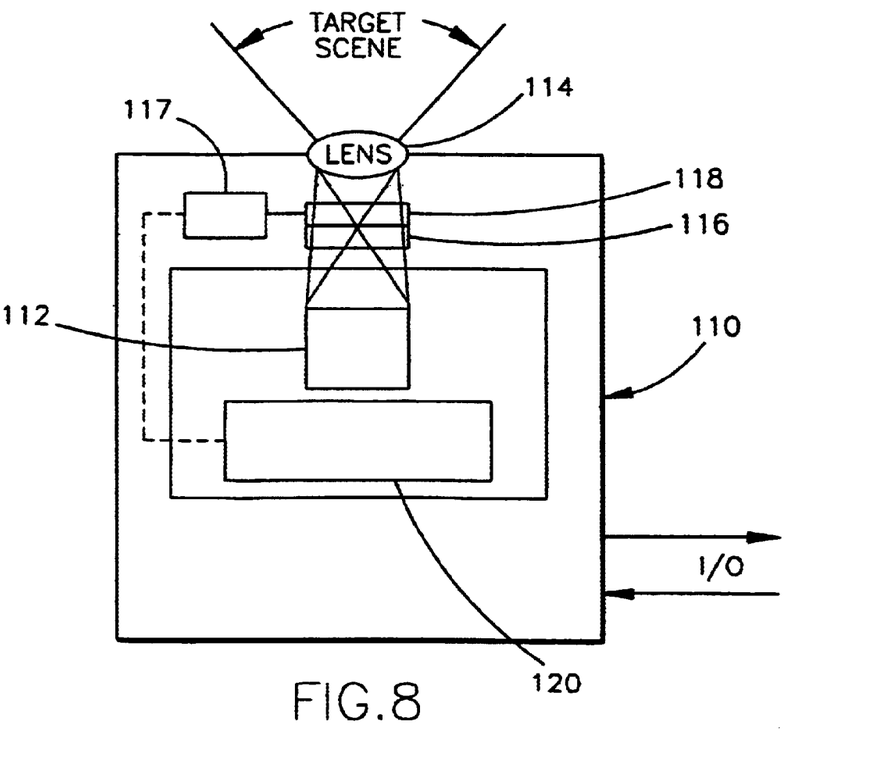
FIG. 8 is a block diagram of an imaging sensor module in accordance with the present invention.

Referring now specifically to FIGS. 8–12 and the illustrative embodiments depicted therein, there is shown in FIG. 8 an imaging sensor module 110 for receiving an image of a target scene. Imaging sensor module 110 may be especially useful with a vehicle in conjunction with, for example, a vehicle headlamp control of the type disclosed in commonly assigned U.S. Pat. No. 5,796,094, issued to Schofield et al., the disclosure of which is hereby incorporated herein by reference, a vehicle back-up aid of the type disclosed in commonly assigned co-pending U.S. pat. application, Ser. No. 09/199,907, filed Nov. 25, 1998 by Bos et al., the disclosure of which is hereby incorporated herein by reference, a vehicle vision system of the type disclosed in commonly assigned U.S. Pat. No. 5,670,935, issued to Schofield et al., the disclosure of which is hereby incorporated herein by reference, or a rain sensor of the type disclosed in commonly assigned PCT application no. PCT/US98/23062, filed Oct. 30, 1998, by Donnelly Corporation, the disclosure of which is hereby incorporated herein by reference. Imaging sensor module 110 could also have other vehicular and non-vehicular applications. Imaging sensor module 110 includes a sensor array 112, which preferably receives the image of the target scene via a focusing lens 114, a color filter 116 and an electro-optic filter 118, all of which are positionable along an optic path between the target scene and sensor 112. Color filter 116 is preferably a conventional color filter, which facilitates the determination of color in the image received by sensor 112. Electro-optic filter 118 preferably controls the amount of light, especially infrared and near infrared wavelengths, that is received by sensor array 112 in response to a voltage being applied to the filter by a control 117. A control 120 is included to receive an output from imaging array sensor 112 and convert the output to digital values via an analog to digital converter (not shown) and communicate the values to an appropriate circuit, such as a display or other receiving circuits, depending on the particular application of the present invention.

Preferably, electro-optic filter 118 includes a thin film of electrochromic material which has significant modulation in the near infrared energy range of wavelengths of approximately 800 to 1,000 nanometers, thereby attenuating the infrared and/or near infrared wavelengths, while having less affect in the visible light region of the spectrum. Control 120 functions to at least occasionally activate imaging array sensor 112 and may selectively activate, deactivate and/or otherwise adjust electro-optic filter 118 in response to variations in lighting conditions. As disclosed in commonly assigned U.S. Pat. No. 5,796,094, control 120 is capable of determining a level of light around the vehicle. Alternatively, a separate photo sensor could be used to determine light conditions to control the signal applied to filter 118. By deactivating electro-optic filter 118 as lighting conditions darken, near infrared and infrared energy may pass through filter 118, thereby providing further illumination of the image of the target scene as received by sensor 112. Control 120 may activate filter 118 to attenuate the near infrared energy under brighter lighting conditions, thereby substantially reducing the effect of the near infrared energy on sensor 112. Electro-optic filter 118 thus provides adjustable filtering of infrared wavelengths.

Figure 9:
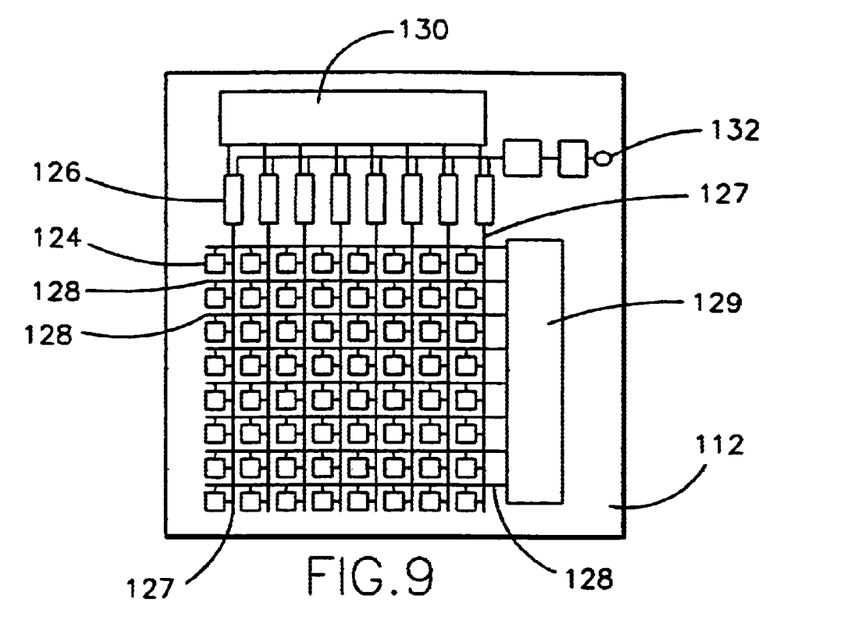
FIG 9 is a layout of a light-sensing array useful with the invention.

Electro-optic filter 118 of the present invention is preferably applied to a pixelated imaging array sensor, such as a CCD or a CMOS sensor. However, the electro-optic filter may be implemented in conjunction with other sensors, and may be implemented with or without a color filter or process associated with the sensor, without affecting the scope of the present invention. Referring to FIG. 9, imaging array sensor 112 is preferably similar to those described in commonly assigned U.S. Pat. Nos. 5,550,677 and 5,796,094, the disclosures of which are hereby incorporated herein by reference. Briefly, imaging array sensor 112 preferably comprises a plurality of photon accumulating light sensors or pixels 124. The array of photo-sensors 124 are interconnected to a vertical shift register 129 and a horizontal shift register 130 via a common word-line 128 and a common bit-line 127, respectively. The bit-lines 127 are also interconnected with amplifiers 126. The registers 129 and 130 function to individually access each photo-sensor pixel or element 124 and provide an output 132 associated with the individual signals to the analog-to-digital converter.

Figure 11:
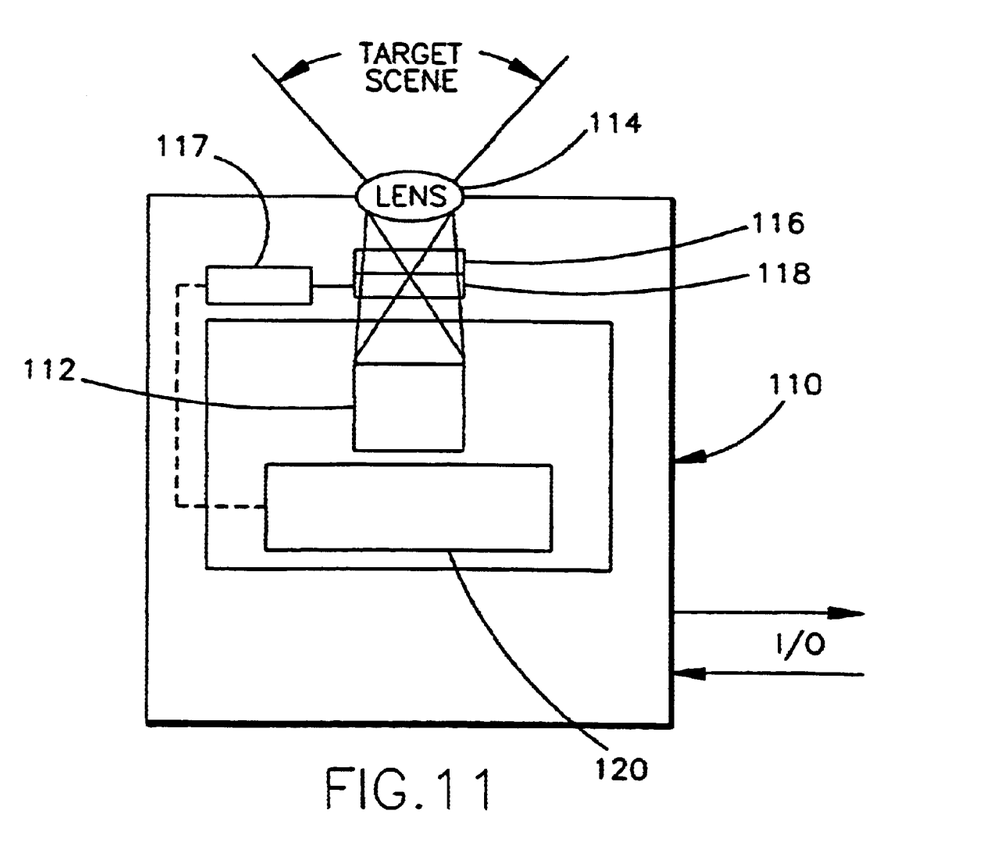
FIG. 11 is the same diagram as FIG. 8 with the electro-optic filter being positioned between the sensor and the color filter.

As white or non-filtered light from the target scene is received by imaging module 110, color filter 116 may function to separate the light into spectral regions in a conventional manner. Preferably, color filter 116 is a mosaic filter which may be deposited directly onto the photo-element array of sensor 112 or may be otherwise positioned along the optic path between the target scene and sensor 112. Control 120 may then process the intensity of light received by the pixels, each of which is associated with a particular color tile or filter, in order to determine the color of light received by each pixel or group of pixels and thus the appropriate colors for the image being received by sensor 112. As shown in FIGS. 8 and 11, electro-optic filter 118 may be implemented on either side of color filter 116 along the optic path between the target scene and sensor 112. Other known color filters or processes may also be implemented without affecting the scope of the present invention. Furthermore, the present invention is applicable with a monochromatic sensor which does not include color filtering or processing.

Electro-optic filter 118 is operable to attenuate a spectral band that will be received by imaging array sensor 112. Preferably, electro-optic filter 118 attenuates a majority of near infrared and infrared energy while allowing a majority of the spectral region of visible light to pass therethrough, thereby substantially avoiding false interpretations of color by control 120 and imaging array sensor 112. Most preferably, electro-optic filter 118 may be adjusted to vary the degree of attenuation of the near infrared and infrared energy in response to a change in the lighting intensity of the target scene, thereby allowing infrared energy to provide additional illumination to sensor 112 as conditions darken, while also attenuating a majority of the infrared energy in brighter lighting conditions. By significantly reducing the infrared energy that is received by sensor 112, electro-optic filter 118 controls the amount of light that may be received by sensor 112 such that scenes which may radiate a substantial amount of infrared and/or near infrared light toward sensor module 110 will not distort the color image captured by array sensor 112. This further allows sensor 112 to be operable through a wider dynamic range, such that sensor 112 is operable under higher lighting conditions.

Electro-optic filter 118 preferably includes a thin electrochromic film across the filter which is most transmissive at all wavelengths of light when no voltage is applied thereto. Preferably, electro-optic filter 118 is similar to the electrochromic devices disclosed in commonly assigned U.S. Pat.

Figure 12:
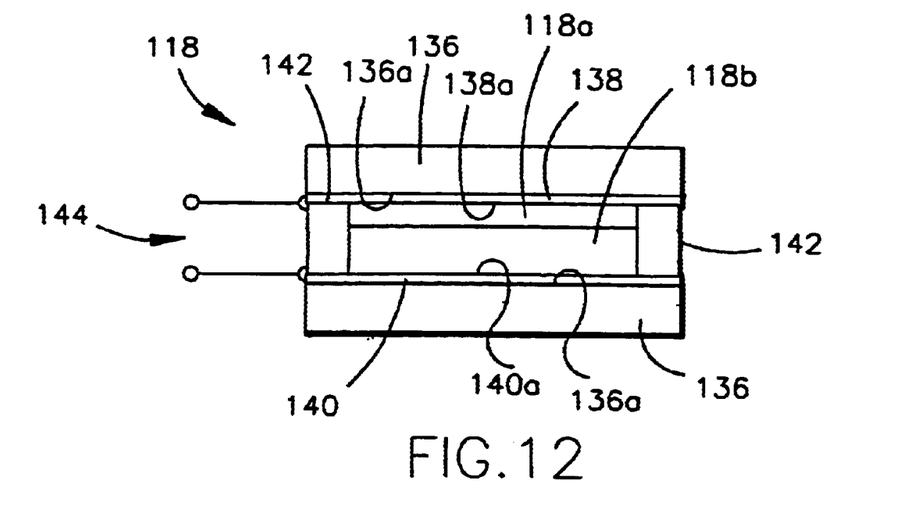
FIG. 12 is an enlarged side elevation of an electro-optic filter in accordance with the present invention.

Nos. 5,729,379 and 5,780,160, the disclosures of which are hereby incorporated herein by reference. As shown in FIG. 12, electro-optic filter 118 preferably includes an electrochromic film which comprises an electrochemically active material 118a and an electrolyte material 118b. Electrochemically active material 118a may be an inorganic material, an organic material or blends and composites of inorganic and organic electrochemically active materials. Preferably, an inorganic metal oxide, such as Tungsten Oxide ($WO_3$), may be implemented. However, other metal oxides, such as $V_2O_5$, $MoO_3$, $Nb_2O_5$, $TiO_2$, $CuO$, $Ni_2O_3$, $Ir_2O_3$, $Cr_2O_3$, $Co_2O_3$, $Mn_2O_3$ or other mixtures thereof, may be implemented without affecting the scope of the present invention. Preferably, the electrolyte material 118b comprises a propylene carbonate (PC), sulfolate (TS), a redox active material, which is preferably a metallocene such as Ferrocene (Fc), and a Lithium compound, such as $LiClO_4$ or $LiBF_4$ or the like. The electrochromic film materials 118a and 118b are most preferably selected to significantly attenuate the infrared and/or near infrared light waves while having minimal affect on the range of visible light passing through the filter and being received by imaging array sensor 112. However, clearly other materials may be selected to attenuate other spectral regions of light. Preferably, as seen in FIG. 12, the electrolyte material 118b and electrochemically active material 118a are contained between a pair of transparent substrates 136 with transparent counter-conducting electrodes 138 and 140 positioned between the film materials 118a and 118b and each of the substrates 136. The transparent substrates 136 may be glass or plastic such as acrylic, polycarbonate, allyl diglycol carbonate or the like. These substrates 136 may also include a coating on their exterior surfaces such as an anti-reflection coating, an anti-fogging coating, an anti-abrasion coating and/or an ultraviolet absorber coating or the like. These protective coatings allow electro-optic filter 118 to be positioned at an outer area of imaging module 110, such as between the target scene and lens 114. The material of the conductive electrodes 138 and 140 is preferably a thin transparent conductive coating such as an Indium Tin Oxide (ITO), a doped indium, tin or zinc oxide or the like and is preferably disposed onto an inner surface 138a of each substrate 136 as a coating. Electrochemically active material 118a may then be contactedly disposed on an inner surface 138a of one of the conducting electrodes 138 while the electrolyte 118b contactedly fills the gap between the electrochemically active material 118a and an inner surface 140a of the other conducting electrode 140. The electrolyte 118b may be a solid or liquid material. A circumferential seal 142 may also be provided around a perimeter of the filter to seal the chemical solutions within the filter. A power source (not shown) may then be applied to an electrical connector 144 to energize electro-optical filter 118 via the counter conducting electrodes 138 and 140, thereby causing the electrochemically active material 118a and electrolyte material 118b to darken or otherwise reduce the transmissivity of the targeted spectral region of light through filter 118.

Figure 10:
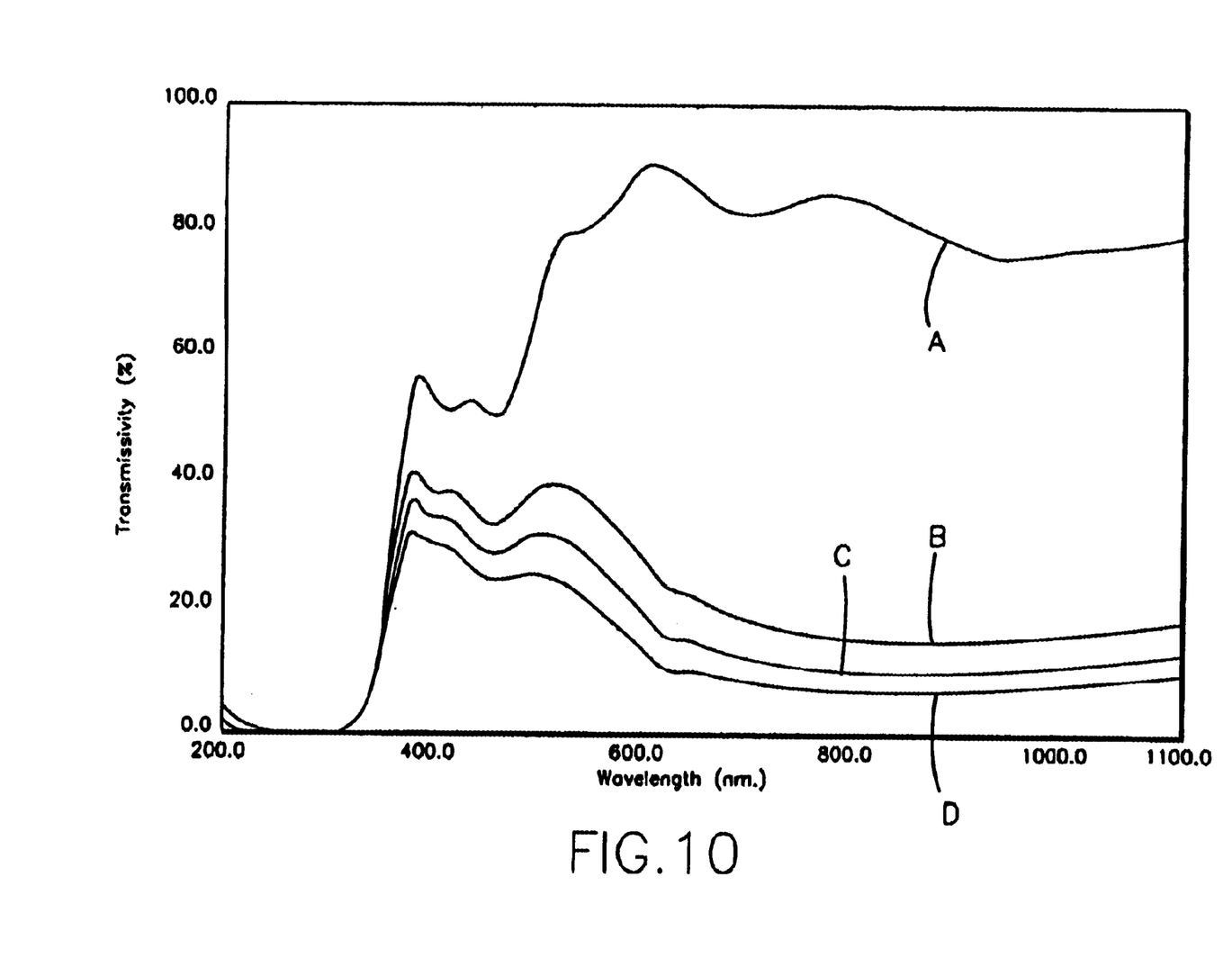
FIG. 10 is a graph illustrating the effects of an electro-optic filter of the present invention on light as received by an imaging sensor.

Referring now to FIG. 10, the transmissivity of light through electro-optic filter 118 is shown and is altered or modulated through activation of electro-optic filter 118 and is further altered in response to the amount of electrical voltage applied to filter 118. The data for the curves in FIG. 10 were collected using an electro-optic filter comprising Indium tin Oxide electrodes, a Tungsten Oxide electrochemically active layer and an electrolyte comprising PC, TS, Fc and $LiClO_4$. The transmissivity of light through electro-optic filter 118 when the filter is de-energized is represented by the curve A, which is at its highest level or greatest transmissivity at wavelengths greater than approximately 600 nanometers. When zero voltage is applied to the electro-optic filter 118, the transmissivity through electro-optic filter 118 is at its peak for all wavelengths, and the light or image which is received and communicated by imaging sensor 112 would correspondingly be at its greatest intensity in the near infrared to infrared range, since most silicon sensors have their peak sensitivity in this region. For larger voltages applied to electro-optic filter 118, the transmissivity through filter 118, and thus the amount of light received by imaging sensor 112, in the infrared and near infrared regions is progressively decreased. This is shown by the three curves B, C and D, which correspond to a voltage of 0.8 volts, 0.9 volts and 1.0 volts, respectively, being applied to electro-optic filter 118. Electro-optic filter 118 thus significantly attenuates the infrared and near infrared wavelengths of energy while having a much less significant affect on the shorter wavelengths of light within the visible light region of the spectrum. Although shown as having the majority of its attenuation in the infrared region, the electrochromic materials may be alternatively selected such that a greater attenuation occurs in different ranges of light. The materials and voltage may thus be selected and tailored to the specific application of the electro-optic filter 118 and imaging sensor module 110.

Preferably, control 120 is operable to selectively energize and/or de-energize electro-optic filter 118 as the sensed lighting conditions change, and may further be operable to continuously vary the voltage being applied to filter 118 in response to lighting changes. When lighting conditions are low, such as at nighttime, electro-optic filter 118 may be de-energized or otherwise adjusted so that imaging sensor 112 may utilize a greater amount of the near infrared portion of the spectrum. In low light conditions, the image may be processed as black and white such that the near infrared and infrared energy provides additional information about the image of the target scene. Conversely, in higher intensity light conditions such as daytime, the image may be processed as color image. Electro-optic filter 118 may then be energized or adjusted to attenuate the near infrared and infrared light while having little effect on the intensity of the light corresponding to the visible spectral range, thereby providing improved coloring of an output signal or image from imaging sensor 112 and allowing the sensor to be effectively operable under such higher lighting conditions.

Accordingly, electro-optic filter 118 is preferably selectively energized or de-energized and the voltage being applied thereto may be continuously varied in response to the lighting conditions in the target scene. Control 120 then may de-energize or vary the transmissivity of filter 118 and process the information received from imaging array sensor 112 in one manner during low lighting conditions in order to utilize the infrared information present in the scene which would otherwise be lost, while energizing or increasing the voltage to the electro-optic filter 118 and processing the information from imaging array sensor 112 in a different manner during high lighting conditions, in order to fully and more effectively extract the color information in the image received by sensor 112. Control 120 may determine the lighting conditions or the amount of light being received by sensor 112 by measuring pixel values of sensor 112 or by communicating with an additional photo-sensor or the like (not shown), and accordingly energize or de-energize electro-optic filter 118 or continuously adjust the voltage being applied thereto in response to the sensed conditions.

Although described as an infrared and near infrared filter, it is envisioned that the electro-optic filter of the present invention may be tailored to filter other spectral regions as well. The electrochromic materials may be selected such that the filter may be a spectrally tuned filter to filter a predetermined range of energy wavelengths. Furthermore, the filter may be operable to filter all of the spectral regions, thereby reducing the intensity of all of the wavelengths of energy that will then be received by the sensor. Additionally, different materials may be provided on a single filter such that the electrochromic filter facilitates the determination of color in a manner similar to a mosaic filter or the like. The filter may then provide an effective color sensor during daytime yet may be de-energized to provide a black and white or monochromatic sensor at nighttime in order to allow substantially all of the energy waves that are present in the target scene to be received by the sensor.

In an alternate embodiment, multiple levels of electro-optic filters or multiple layers of electrodes and corresponding film materials may be implemented substantially adjacent to an imaging array sensor along the optic path between the target scene and the sensor. Preferably, each of the electro-optic filters or layers would include a different electrochromic film material which may be operable to attenuate different spectral regions of light, such that a control circuit may selectively energize one or more of the electro- optic filters or layers at a given time to attenuate a desired range of wavelengths for that particular application and/or lighting conditions. This allows the present invention to vary the range of light wavelengths to be received by the imaging sensor at any particular given time.

Therefore, the present invention provides an adjustable infrared filter which is selectively operable to substantially attenuate near infrared and infrared energy. This provides accurate color processing of an output signal or image from an imaging array sensor while also allowing the imaging array sensor to be operable under a greater range of lighting conditions. By modulating the degree of attenuation, the infrared energy present in the target scene will not dominate the sensor during higher intensity lighting conditions, yet may be selectively received as additional illumination by the sensor in low intensity lighting. Furthermore, the electro-optic filter of the present invention may be automatically energized and/or de-energized and/or continuously varied in response to changes in the sensed lighting conditions surrounding the imaging array sensor, thereby providing improved illumination during nighttime conditions, or other situations where the attenuated region may be useful for image processing, and improved color processing during daytime conditions.

Changes and modifications in the specifically described embodiments can be carried out without departing from the principles of the invention, which are intended to be limited only by the scope of the appended claims, as interpreted according to the principles of patent law.

The embodiments of the invention in which an exclusive property right or privilege is claimed are defined as follows:

1. A vehicular imaging system for capturing an image comprising:
   an imaging sensor;
   an electro-optic filter which is operable to attenuate light in response to a voltage applied to said electro-optic filter, said electro-optic filter being positioned along an optic path to said imaging sensor; and
   a control for applying said voltage to said electro-optic filter.

2. The imaging system of claim 1, wherein said control is operable to selectively apply said voltage to said electro-optic filter.

3. The imaging system of claim 2, wherein said control is operable to selectively apply said voltage to said electro-optic filter in response to an ambient light intensity.

4. The imaging system of claim 1, wherein said electro-optic filter includes an electrochromic medium which attenuates light in response to said voltage being applied to said electro-optic filter.

5. The imaging system of claim 1, wherein said electro-optic filter is operable to attenuate light having a wavelength comprising a near infrared light wavelength in response to said voltage.

6. The imaging system of claim 1, wherein said electro-optic filter is operable to attenuate light having a wavelength within a range of wavelengths in response to said voltage.

7. The imaging system of claim 6, wherein said range of wavelengths includes near infrared light wavelengths.

8. The imaging system of claim 1, wherein said electro-optic filter is operable to substantially attenuate light having a wavelength greater than approximately 750 nanometers in response to said voltage.

9. The imaging system of claim 8, wherein said electro-optic filter is operable to substantially transmit light having a wavelength less than approximately 700 nanometers when said voltage is applied.

10. The imaging system of claim 9, wherein said control is operable to apply said voltage in response to a threshold ambient light level.

11. The imaging system of claim 1, wherein said electro-optic filter is spectrally tuned to filter a predetermined range of light wavelengths in response to said voltage.

12. The imaging system of claim 1, wherein said electro-optic filter comprises at least two electro-optic filters.

13. The imaging system of claim 12, wherein one of said at least two electro-optic filters is operable to attenuate light having a wavelength within a different range of wavelengths than the other of said at least two electro-optic filters in response to said voltage.

14. The imaging system of claim 1, wherein said control is operable to vary said voltage applied to said electro-optic filter.

15. The imaging system of claim 14, wherein said electro-optic filter is operable to vary a transmissivity of light through said electro-optic filter in response to said control varying said voltage applied to said electro-optic filter.

16. The imaging system of claim 1 including an ambient light sensor operable to sense ambient light intensity, said control being operable to adjust said voltage applied to said electro-optic filter in response to said ambient light sensor.

17. The imaging system of claim 1, wherein said electro-optic filter comprises an electrochromic medium at least partially disposed on said electro-optic filter, said electrochromic medium being operable to attenuate light passing therethrough in response to said voltage being applied to said electro-optic filter.

18. The imaging system of claim 17, wherein said electrochromic medium comprises at least one of an electrochromic film, an electrochromic solid polymer film, and an electrochromic solution.

19. The imaging system of claim 17, wherein said electrochromic medium is energizable to attenuate light through at least one outer circumferential region of said electro-optic filter while a center region of said electro-optic filter allows light to pass therethrough, said center region being defined by said at least one outer circumferential region.

20. The imaging system of claim 19, wherein said at least one outer circumferential region comprises multiple regions of said electrochromic medium, said control selectively applying said voltage to each said region to attenuate light through that region, said electro-optic filter allowing inwardly positioned regions to pass light therethrough.

21. The imaging system of claim 17, wherein said control is operable to adjust said voltage applied to said electro-optic filter in response to a change in an ambient light intensity.

22. The imaging system of claim 21, wherein said imaging sensor comprises a photon accumulating sensor.

23. The imaging system of claim 22, wherein said imaging sensor comprises a color sensor, said imaging system further including a color filter.

* * * * *

UNITED STATES PATENT AND TRADEMARK OFFICE
CERTIFICATE OF CORRECTION

PATENT NO. : 6,667,471 B2  
APPLICATION NO. : 10/206558  
DATED : December 23, 2003  
INVENTOR(S) : Bos et al.

Page 1 of 1

It is certified that error appears in the above-identified patent and that said Letters Patent is hereby corrected as shown below:

Column 1  
Line 7, delete "entitled" after "09/493,522"  
Line 8, insert --entitled-- after "6,426,492"

Column 3  
Line 40, "therethrough." should be --therethrough;--  
Line 42, "FIG 9" should be --FIG. 9--

Column 6  
Line 29, insert --thereof, may be implemented-- after "mixtures"

Column 9  
Line 13, delete "," after "increasing"

Column 13  
Line 49, "seal." should be --seal--

Signed and Sealed this

Third Day of February, 2009

JOHN DOLL  
*Acting Director of the United States Patent and Trademark Office*